US012571749B2

(12) United States Patent
Linseis et al.

(10) Patent No.: US 12,571,749 B2
(45) Date of Patent: Mar. 10, 2026

(54) THERMAL DIFFUSIVITY MEASURING DEVICE

(71) Applicant: Linseis Messgeräte GmbH, Selb (DE)

(72) Inventors: Vincent Linseis, Hof (DE); Florian Linseis, Selb (DE); Sebastian Feulner, Bindlach (DE)

(73) Assignee: LINSEIS MESSGERÄTE GMBH, Selb (DE)

( * ) Notice: Subject to any disclaimer, the term of this patent is extended or adjusted under 35 U.S.C. 154(b) by 645 days.

(21) Appl. No.: 18/048,315

(22) Filed: Oct. 20, 2022

(65) Prior Publication Data

US 2023/0128534 A1 Apr. 27, 2023

(30) Foreign Application Priority Data

Oct. 22, 2021 (DE) .......................... 102021127596.2

(51) Int. Cl.
*G01N 25/18* (2006.01)
*G01J 5/00* (2022.01)
(Continued)

(52) U.S. Cl.
CPC ............ *G01N 25/18* (2013.01); *G01J 5/0044* (2013.01); *G01J 5/0806* (2013.01); *G01J 5/0896* (2013.01);
(Continued)

(58) Field of Classification Search
CPC ...... G01N 25/18; G01J 5/0044; G01J 5/0806; G01J 5/0898; G01J 5/10; G01J 2005/0077
(Continued)

(56) References Cited

U.S. PATENT DOCUMENTS 4,243,327 A * 1/1981 Frosch ................... G01N 25/18
374/45
4,928,254 A 5/1990 Knudsen
(Continued)

FOREIGN PATENT DOCUMENTS

DE 69835803 T2 9/2007
DE 102019005420 A1 2/2020
(Continued)

OTHER PUBLICATIONS

Flash Method of Determining Thermal Diffusivity, Heat Capacity and Thermal Conductivity (Year: 1961).*
(Continued)

*Primary Examiner* — Kristina M Deherrera
(74) *Attorney, Agent, or Firm* — WCF IP

(57) ABSTRACT

A thermal diffusivity measuring device includes a sample holder, a light source, e.g., pulsed laser or flash lamp, designed to emit a pulse of light of a predetermined impulse energy, an optical system for directing the pulse of light in a light path onto the sample in the sample holder, an infrared sensor for time-dependent detection of an infrared radiation intensity emitted by the sample, and an evaluation unit designed to automatically calculate the thermal diffusivity of the sample on the basis of the time-dependent infrared radiation intensity. In addition, the light source may have a continuous wave laser that is designed to emit an intensity-modulated laser beam, the intensity of which is modulated with an intensity modulation frequency. The light source is arranged to emit the laser beam along a light path. The evaluation unit is designed to automatically calculate the thermal diffusivity of the sample on the basis of the time-dependent infrared radiation intensity and the intensity-modulation frequency.

11 Claims, 5 Drawing Sheets

(51) Int. Cl.

| | |
|---|---|
| *G01J 5/08* | (2022.01) |
| *G01J 5/0806* | (2022.01) |
| *G01J 5/10* | (2006.01) |

(52) U.S. Cl.
CPC ......... *G01J 5/10* (2013.01); *G01J 2005/0077* (2013.01)

(58) Field of Classification Search
USPC ........................................................... 374/43
See application file for complete search history.

(56) References Cited

U.S. PATENT DOCUMENTS

| | | | |
|---|---|---|---|
| 5,118,945 A | 6/1992 | Winschuh et al. | |
| 6,260,997 B1 | 7/2001 | Claybourn | |
| 6,273,603 B1 * | 8/2001 | Cheindline | G01N 25/18 |
| | | | 374/124 |
| 10,302,497 B2 * | 5/2019 | Brunner | G01J 5/0255 |
| 2002/0126730 A1 * | 9/2002 | Sun | G01N 25/72 |
| | | | 374/5 |

| | | | |
|---|---|---|---|
| 2006/0153269 A1 | 7/2006 | Lakestani et al. | |
| 2016/0033431 A1 * | 2/2016 | Hatori | G01N 25/00 |
| | | | 374/43 |
| 2018/0128759 A1 * | 5/2018 | Hurley | G01N 25/18 |
| 2020/0110047 A1 * | 4/2020 | Hume | F25D 31/005 |

FOREIGN PATENT DOCUMENTS

| | | |
|---|---|---|
| EP | 0394932 B1 | 3/1998 |
| JP | 2018025560 A | 2/2018 |

OTHER PUBLICATIONS

Lasers only website https://lasersonly.com/blogs/posts/continuous-wave-laser-vs-pulsed-laser#:~:text=Unlike%20pulsed%20lasers%20that%20emit,cutting%2C%20welding%2C%20or%20heating (Year: 2025).*

Zhang, Y. et al., "Suspended 2D anisotropic materials thermal diffusivity measurements using dual-wavelength flash Raman mapping method", International Journal of Heat and Mass Transfer vol. 145, 2019.

* cited by examiner

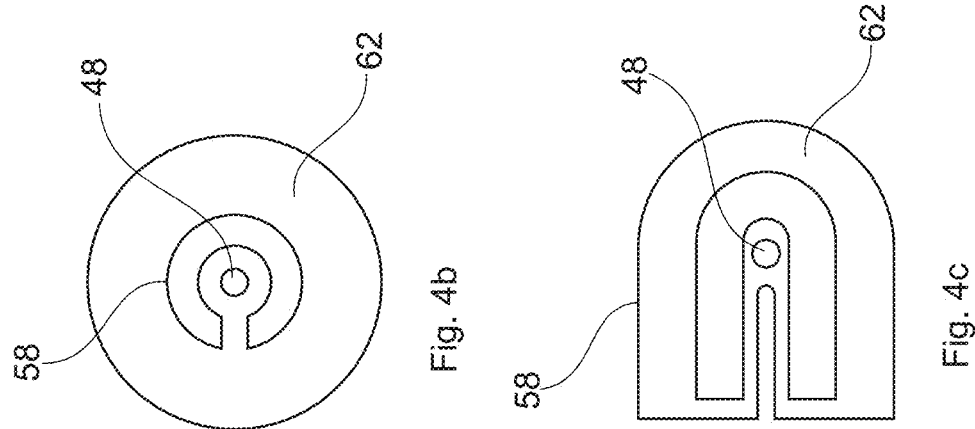
Fig. 4b
Fig. 4c
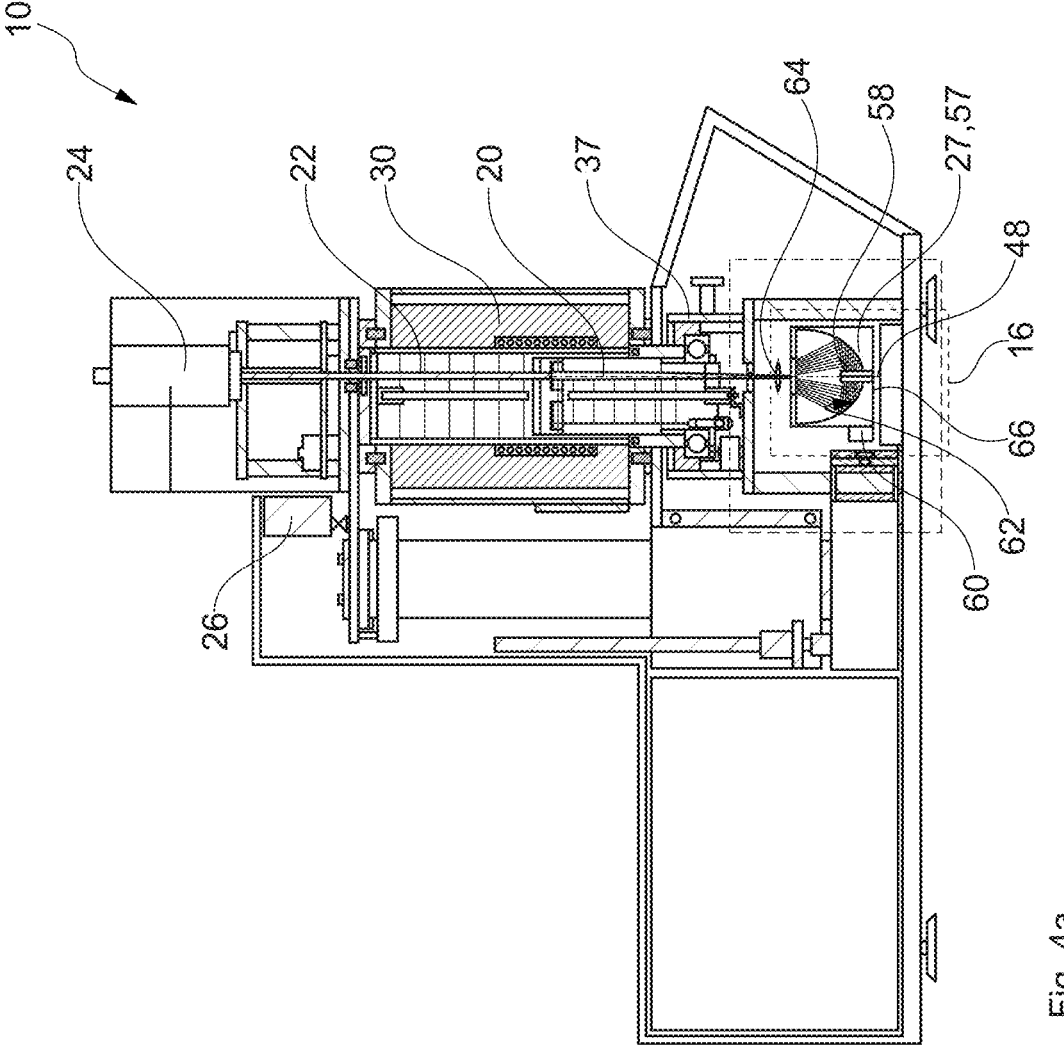
Fig. 4a

16

20, A₂₄

70

68

58

48

60

62

64

27, 57

THERMAL DIFFUSIVITY MEASURING DEVICE

FIELD OF THE INVENTION

The invention relates to a thermal diffusivity measuring device with (a) a sample holder to accommodate a sample to be measured, (b) a light source, e.g., a pulsed laser or a flash lamp, that is designed to emit a pulse of light of a predetermined pulse energy, (c) an optical system for directing the pulse of light in a light path onto the sample, (d) an infrared sensor for time-dependent detection of an infrared radiation intensity emitted due to the irradiation of the sample with the pulse of light, and (e) an evaluation unit that is designed to automatically calculate the thermal diffusivity of the sample on the basis of the time-dependent infrared radiation intensity and particularly a thickness of the sample. Such a thermal diffusivity measuring device is therefore designed, in particular, to measure thermal diffusivity using the so-called light pulse method.

BACKGROUND

Thermal diffusivity measuring devices are used to determine the thermal diffusivity of samples that generally have a thickness of between 0.1 mm and 6 mm, provided that the thermal diffusivity of the sample is sufficiently small. The measurement of the thermal diffusivity is often performed as a function of temperature. It has been found that samples exist for which temperature-dependent thermal diffusivity cannot be obtained over the full temperature range with satisfactory measurement uncertainty.

Moreover, it is known to measure thermal diffusivity by means of the so-called Angstrom method, in which a sample is irradiated with a laser beam, the intensity of which is modulated with a predetermined frequency. However, it has been found that even this method is not possible over the full temperature range with low measurement uncertainty for temperature-dependent measurements.

US 2016/0033431 A2 describes a device for conducting the Angstrom method. Infrared light from an infrared source is focused by means of a lens on the sample to be examined. The infrared radiation emitted by the sample is guided to a radiation thermometer by means of a light conductor.

US 2006/0153268 A1 also describes a device for conducting the Angstrom method in which both the modulated laser light signal and the modulated temperature signal are measured.

EP 0 394 932 B1 describes a method in which a sample is repeatedly irradiated with a laser that is switched on and off. A pilot light beam can be used to target the point on the sample that is subsequently irradiated with the laser.

SUMMARY

The invention aims to improve the measurement of thermal diffusivity.

The invention solves the problem by way of a thermal diffusivity measuring device according to the preamble in which the light source is a continuous wave laser designed to emit an intensity-modulated laser beam and the intensity of which is modulated with an intensity modulation frequency.

The invention also solves the problem by way of a method featuring the steps: (a) emitting a pulse of light, e.g., from a pulsed laser or a flash lamp, of a predetermined pulse energy along a light path onto a sample to be measured by means of a light source, (b) time-dependent detection of an infrared radiation intensity $I_{22}$ emitted by the sample using an infrared sensor and (c) automatically calculating the thermal diffusivity of the sample using the time-dependent infrared radiation intensity $I_{22}$, (d) emitting an intensity-modulated laser beam, the intensity of which is modulated with an intensity modulation frequency fi, onto the sample by means of a continuous wave laser and which runs along the light path, and (e) automatically calculating the thermal diffusivity of the sample using the time-dependent infrared radiation intensity $I_{22}$ and the intensity modulation frequency $f_r$. This method is preferably conducted using a thermal diffusivity measuring device according to the invention. Preferred embodiments of the method according to the invention are specified above within the scope of the method carried out by the evaluation unit.

The continuous wave laser is preferably arranged to emit the laser beam into the light path.

It is possible, but not essential, for the light source to feature a light injector, which is arranged to inject the laser beam into the light path.

The evaluation unit is preferably designed to automatically calculate the thermal diffusivity of the sample from the time-dependent infrared radiation intensity and the intensity modulation frequency and particularly the thickness of the sample and, where applicable, a lateral offset between an optical axis of the infrared sensor and a strike point of the laser beam on the sample.

The light source preferably comprises a pulse light source. The pulse light source can preferably be a pulse laser for emitting the pulse of light. The pulse laser can be an Nd:YAG laser that emits at 1064 nm.

Alternatively, the pulse light source may comprise a flash lamp, such as a xenon flash lamp.

It is advantageous if a wavelength of a continuous wave laser differs from the wavelength of the pulse light source, e.g., the pulse of light emitted by the pulse laser or the flash lamp. The advantage of such a thermal diffusivity measuring device is that thermal diffusivity can be measured with comparatively low measurement uncertainty on such samples whose product from thickness and thermal diffusivity and/or whose quotient from thickness and thermal diffusivity changes during the measuring process. For example, if the thermal diffusivity of the sample increases during measurement, measurement uncertainty generally increases when the light pulse method is used.

If the evaluation unit—as provided according to a preferred embodiment—is designed to measure thermal diffusivity on a sample for each temperature both by means of the light pulse method and by means of the Angstrom method, the measured value of the method that has the smaller measurement uncertainty can be used, in particular exclusively. In this way, thermal diffusivity can always be determined with the lowest possible measurement uncertainty.

This advantage is often relevant if the sample being examined irreversibly changes during measurement. The invention also includes a method in which thermal diffusivity is measured by means of a thermal diffusivity measuring device.

Such a method preferably comprises the measurement of a sample whose thermal diffusivity irreversibly changes when it is heated. This is understood particularly to mean that, when the temperature of the sample is the same, thermal diffusivity depends on whether the sample has been heated to a temperature above a threshold temperature. For example, a sample is measured that irreversibly expands when an activation temperature is exceeded. Such a material can be an intumescent material, for example.

The injection of the laser beam into the light path ensures that with both methods, thermal diffusivity is carried out at the same point on the sample. This minimizes systematic measurement deviations.

In its most general form, the invention solves the problem by way of a diffusivity measuring device according to the preamble, the light source (e.g., a flash lamp or a pulsed laser) which is designed to emit an intensity-modulated laser beam, its intensity being modulated with an intensity modulation frequency. It is then preferable that the light source emits a pulse light source, in particular a pulse laser, which is designed to emit the pulse of light and to emit pulse sequences with a pulse sequence frequency of at least 50 kHz and/or at most 500 kHz.

The invention also solves the problem by way of a diffusivity measuring device according to the preamble in which the light source comprises (a) a laser for emitting the pulse of light and emitting a continuous laser beam, (b) an intensity modulator for modulating an intensity of the laser beam and (c) a beam switch for switching the intensity modulator in and out of the light path of the continuous laser beam. However, both of these setups are generally less suitable than the setup described at the beginning. Nevertheless, the preferred embodiments stated in the following also apply for these two aspects of the invention.

Within the scope of the present description, the feature that the evaluation unit is designed to automatically calculate the thermal diffusivity of the sample on the basis of the time-dependent infrared radiation intensity is understood particularly to mean that the infrared radiation intensity is used in the calculation, i.e. it is included in the calculation. Further variables are usually included in the calculation, especially the thickness of the sample.

The feature that the thermal diffusivity of the sample is calculated using the time-dependent infrared radiation intensity is understood particularly to mean that this infrared radiation intensity has been caused by the pulse of light.

In other words, the evaluation unit is preferably designed to automatically calculate the thermal diffusivity of the sample using the time-dependent infrared radiation intensity caused by precisely one pulse of light. This is the light pulse method.

It is advantageous if the intensity modulation frequency is greater than 0.01 Hz, especially greater than 0.1 Hz. Preferably, the intensity modulation frequency is at most 500 kHz, especially at most 300 kHz.

According to a preferred embodiment, the light source features a pulse light source in the form of a flash lamp. The flash lamp may be a noble gas flash lamp in which the pulse of light is generated through ionization of a noble gas. The flash lamp is preferably a xenon or krypton flash lamp.

It is practical if the intensity-modulated laser beam passes through the flash lamp. This should be understood in particular to mean that the intensity-modulated laser beam is surrounded in a plane that extends perpendicular to its direction of expansion by a projection of the flash lamp onto this plane. Alternatively or additionally, the intensity-modulated laser beam passes through a convex envelope of the flash lamp. The convex envelope of the flash lamp is the spatial area of all points that lie on connecting paths of two points of the flash lamp.

For example, it is advantageous if the flash lamp comprises a curved flash tube. The flash lamp has a pulse duration of, for example, at least 0.05 ms and/or at most 20 ms, especially at most 10 ms, especially preferably at most 5 ms.

The flash lamp can be constructed from two or more partial lamps connected in parallel.

The temperature diffusivity measuring device preferably has a sample changer, which comprises one sample holder and at least a second sample holder. At least one sample whose temperature diffusivity is to be measured can be accommodated in each sample holder. For example, the sample changer features 3, 4, 5 or more sample holders. It is usually advantageous if the number of sample holders is lower than 100, especially lower than 50.

The evaluation unit is preferably configured to automatically carry out a method featuring the steps: (I) measuring the thermal diffusivity of a first sample held by the first sample holder by means of the intensity-modulated laser beam, i.e. using the Angstrom method, or by means of the pulse of light, (ii) controlling the sample changer so that a second sample held by the second sample holder is brought into the light path, (iii) measuring the thermal diffusivity of the at least one sample using the method according to step (i), i.e. Measuring the thermal diffusivity by means of the Angstrom method or the pulse of light, and (iv) subsequently measuring the thermal diffusivity of the samples using the method that was not used in step (i).

In other words, it is possible that in step (i) a measurement is only performed by means of the intensity-modulated laser beam. In step (iv), a measurement is then performed using the pulse of light. Alternatively, a measurement is performed in step (i) by means of the pulse of light and in step (iv) by means of the intensity-modulated laser beam. The advantage of this is that there are always two thermal diffusivity measured values. If it is observed following a series of measurements that one of the two thermal diffusivity measurement methods does not deliver useful results and/or exhibits too high a measurement uncertainty, the measured values of the other method can be used. This allows for largely automated measurement. While carrying out both thermal diffusivity measurements is slightly more time-consuming, this disadvantage is outweighed by the advantage that there is a considerably higher chance of capturing at least one thermal diffusivity measured value with a sufficiently small measurement uncertainty.

The evaluation unit is preferably configured to automatically carry out a method featuring the steps: (I) measuring the thermal diffusivity of the first sample by means of an intensity-modulated laser beam, i.e. by means of the Angstrom method, (ii) controlling the sample changer so that the second sample is brought into the light path, (iii) measuring the thermal diffusivity of the at least one second sample by means of an intensity-modulated laser beam and subsequently (iv) measuring the thermal diffusivity of the first and at least one second sample by means of a pulse of light. In other words, in particular, all samples are first measured using the Angstrom method and then using the light pulse method. The advantage of this is that, with the Angstrom method, only one comparatively small amount of heat is introduced into the respective sample. If the temperature of the sample is relevant, only a short time is needed after the measurement to release the heat that was introduced into the sample.

To be able to measure thermal diffusivity as a function of temperature, the thermal diffusivity measuring device preferably has a furnace that is designed to set a predetermined temperature. The sample holder is arranged in the furnace such that the sample can be brought up to the predetermined temperature.

The evaluation unit is then preferably configured to automatically carry out a method featuring the steps: (I) controlling the furnace so that the furnace is brought up to the predetermined temperature, (ii) detecting that the furnace is at the predetermined temperature, (iii) measuring the thermal diffusivities of the at least one sample in the sample holder by means of an intensity-modulated laser beam and/or a pulse of light and (iv) repeating the previous steps for at least a second predetermined temperature that differs from the first temperature.

The particular advantage of this thermal diffusivity measuring device is that the chances are considerably higher than with known devices that at least one thermal diffusivity measured value is obtained that has a sufficiently low measurement uncertainty, usually without it leading to a significantly longer measuring time. This is because bringing the samples to the predetermined temperature is the rate-determining step.

According to a preferred embodiment, the evaluation unit is configured to automatically conduct a method featuring the steps (i) detecting that the furnace is at the first predetermined temperature, (ii) measuring the thermal diffusivity of the first sample by means of the intensity-modulated laser beam or the laser pulse, (iii) controlling the sample changer so that the at least one second sample (14.2) is brought into the laser pulse light path (20), (iv) measuring the thermal diffusivity of the at least one second sample via the method that was used in step (ii), (v) measuring the thermal diffusivity via the method that was not used in step (ii), and (iv) repeating steps (i) to (v) for at least a second predetermined temperature that differs from the first temperature. It is advantageous for the step of measuring thermal diffusivity via the method that was not used in step (ii) to be performed after step (ii) and before step (iii).

The evaluation unit is preferably configured to automatically carry out a method featuring the steps: (i) measuring thermal diffusivity by means of an intensity-modulated laser beam at at least two points on the sample and (ii) determining a measurement uncertainty of the measurement of the thermal diffusivity by means of a pulse of light. The method preferably also includes the step of reducing the number of points at which thermal diffusivity is measured if the measurement uncertainty exceeds a predetermined measurement uncertainty threshold value. In particular, the number of points can be reduced to zero.

The spatially resolved thermal diffusivity measurement provides more detailed information about the properties of the sample under examination. However, the measurement is time-consuming. If it transpires that the measurement uncertainty threshold value has been exceeded and the measurement uncertainty is therefore too great, this time-consuming measurement can be automatically terminated. In other words, if the measurement uncertainty is so great that a reliable statement can no longer be made, the number of points at which the thermal diffusivity is measured is reduced, if necessary to zero.

Measurement uncertainty can be determined, for example, by adjusting the time-dependent recorded infrared radiation intensities, i.e. the time-dependent recorded measured values for the infrared radiation intensity, with a model function. The adjustment can also be referred to as fitting. The root mean square error that exists between the model function and the actual measured values at the best fit is a measure of measurement uncertainty. If this root mean square error exceeds a predetermined threshold value, it is assumed that the measurement uncertainty has exceeded the measurement uncertainty threshold value.

The evaluation unit is preferably configured to automatically carry out a method featuring the steps: (a) measuring thermal diffusivity by means of a pulse of light thereby obtaining a light pulse thermal diffusivity measured value, (b) spatially resolved measurement of the thermal diffusivity by means of an intensity-modulated laser beam at at least two points, thereby obtaining an Angstrom thermal diffusivity measured value, and (c) calculating an inhomogeneity parameter that describes an inhomogeneity of the sample from the light pulse thermal diffusivity measured value and the Angstrom thermal diffusivity measured values.

The advantage of this is that the inhomogeneity parameter can be determined especially quickly. With devices from the prior art, a plurality of thermal diffusivities must first be measured at different points on the sample. The mean value is then determined from these thermal diffusivities and, on the basis of this mean value, the deviations between the mean value and the respective locally measured value are determined. The light pulse thermal diffusivity measured value also represents a mean value of the thermal diffusivity over the illuminated surface and can be determined considerably faster than with the Angstrom method.

The inhomogeneity parameter depends uniquely on the inhomogeneity of the thermal diffusivity of the sample. For example, the inhomogeneity parameter can be the mean squared error of the measured values from the mean value, in particular from the light pulse thermal diffusivity measured value. Alternatively, the inhomogeneity parameter may be the maximum of the deviations, for example.

Preferably, the sample holder is designed to position the samples in two positional degrees of freedom transverse to an optical axis of the infrared sensor. For example, the first positional degree of freedom is a rotational degree of freedom. In other words, the sample holder is designed to rotate about a sample holder rotational axis. Alternatively or additionally, the second positional degree of freedom is a radial component, meaning that the sample holder is designed to move the samples in such a way that the distance to the sample holder rotational axis changes. However, it is also possible that the sample holder has an X-Y table. Again, alternatively, a positional degree of freedom can be the lateral offset. In other words, the lateral offset can be altered to change the position at which the laser beam strikes the sample.

It may be advantageous to know the precise point at which the thermal diffusivity is measured. For example, the thermal diffusivity measurement device has a camera that is arranged to record an image of the sample and, in particular, of the laser beam. For example, the camera is sensitive to visible light and/or infrared light.

According to a preferred embodiment, the thermal diffusivity measurement device has a camera that is arranged to record an image of the sample and, in particular, of the laser beam.

The invention also includes a thermal diffusivity measuring device with (a) a light source that features a continuous wave beam, which is designed to emit an intensity-modulated laser beam, the intensity of which is modulated with an intensity modulation frequency, (b) an evaluation unit that is designed to automatically calculate the thermal diffusivity of the sample from a time-dependent infrared radiation intensity, and (c) a camera that is arranged to record an image of the sample and, in particular, of the laser beam. It is advantageous, but not essential, for this thermal diffusivity measuring device to also feature all properties in accordance with the main claim. The preferred embodiments specified in this description also apply for this invention.

It is practical if the optical system is designed to displace the light path transverse to the optical axis of the infrared sensor, so that a lateral offset s between the optical axis of the infrared sensor and a strike point of the laser beam can be adjusted. It is then possible to measure an anisotropy of the thermal diffusivity.

Preferably, the optical system comprises a beam expander. The beam expander preferably includes at least one lens. It is advantageous if the beam expander is designed in such a way that the beam expanding effect is greater for the light of the pulse light source than for the light of the continuous wave laser. Preferably, a refractive index for the light of the pulse light source is at least 1.2 times, especially at least 1.3 times, especially preferably at least 1.5 times the refractive index for light of the pulse light source.

The automatic calculation of the thermal diffusivity $\alpha$ of the sample on the basis of the time-dependent infrared radiation intensity and the intensity modulation frequency $f_I$ is preferably performed using the formula $$\theta = L\sqrt{\frac{\pi}{\alpha}}\sqrt{f_I},$$

wherein $\theta$ is a phase shift between the modulated intensity of the laser beam on the one hand and the infrared radiation intensity $I_{22}$ on the other, L is the thickness L of the sample and $\pi$ is Pi. The characteristic that the calculation is performed on the basis of this formula is understood to mean that a calculation is performed that contains the same linkage of the specified formula variables as the specified formula. Of course, it is possible that instead of the given variables other variables are given, which are uniquely, especially linearly, related to the variable given in the formula. For example, instead of the phase shift $\theta$, the difference of a first phase shift of the intensity of the laser beam in relation to a fixed reference frequency on the one hand and a second phase shift of the infrared radiation intensity relative to the same fixed reference frequency on the other can of course be used.

The automatic calculation of the thermal diffusivity $\alpha$ of the sample on the basis of the time-dependent infrared radiation intensity $I_{22}$ is preferably performed using the formula $$\alpha = 0.13879\frac{L^2}{t_{1/2}},$$

wherein $t_{1/2}$ denotes the half rise time. The half rise time $t_{1/2}$ is the time that elapses between the pulse of light striking the sample and the time at which the temperature has reached half a temperature maximum. The temperature maximum is the highest temperature that the sample reaches due to the pulse of light.

A method for measuring the thermal diffusivity is understood particularly to also mean a method for measuring the thermal conductivity when the specified calculation is used, and the density and specific thermal capacity of the substance are also used for the calculation.

DESCRIPTION OF THE DRAWINGS

In the following, the invention will be explained in more detail with the aid of the accompanying drawings. They show.

DETAILED DESCRIPTION

Figure 1:
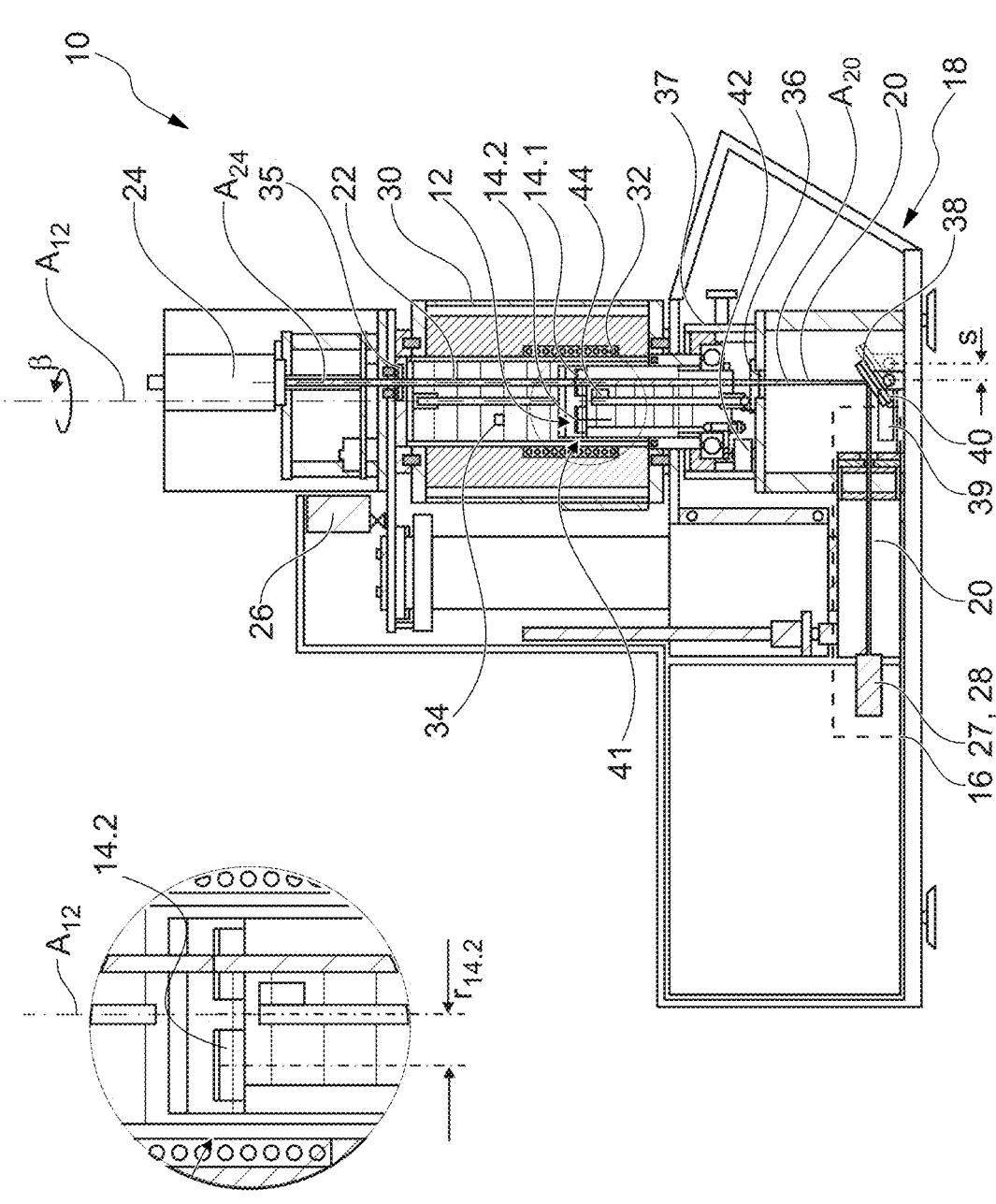
FIG. 1 a scaled cross-section through a thermal diffusivity measuring device according to the invention in accordance with an embodiment of the invention, FIG. 2a a schematic drawing of the thermal diffusivity measuring device according to FIG. 1, FIG. 2b a diagram in which the time-dependent infrared intensities in the light pulse method are depicted, and FIG. 3a a diagram in which the time-dependent infrared intensities in the Angstrom method are depicted, FIG. 3b a schematic view of a sample surface of the sample with the points at which is the laser beam strikes, FIG. 4a a cross-section through a thermal diffusivity measuring device according to the invention in accordance with a second embodiment of the invention, FIG. 4b a cross-sectional view of a flash lamp of the thermal diffusivity measuring device according to FIG. 4a, FIG. 4c a cross-sectional view of a second embodiment of a flash lamp of the thermal diffusivity measuring device according to FIG. 4a and FIG. 5 a perspective sectional view through a light source of a thermal diffusivity measuring device according to the invention in accordance with a second embodiment of the invention.

FIG. 1 shows a thermal diffusivity measuring device 10 that comprises a sample holder 12 for accommodating at least a first sample 14.1 and a second sample 14.2. During operation, each light source 16 emits individual pulses of light. Each pulse of light has an impulse energy W of preferably between W=5 J and W=50 J.

The pulses of light are directed on a light path 20 by means of an optical system 18. If the pulse of light strikes the sample 14.1, it emits infrared radiation 22. The infrared radiation 22 is bundled with collection optics and the infrared radiation intensity $I_{22}(t)$ of the resulting infrared beam measured by means of an infrared sensor 24 as a function of time t. The infrared radiation intensity $I_{22}(t)$ is detected by an evaluation unit 26.

The light source 16 has a pulse light source 27 in the form of a pulse laser 28, which may be, for example, an Nd:YAG laser, in particular a Q-switched laser.

The sample holder 12 is arranged in a furnace 30, which can be brought to a predetermined temperature T by a heating element 32, in particular an electrical heating element. The furnace 30 preferably features a thermometer 34, by means of which the temperature T of the samples 14.i (i=1, 2, . . . ) can be measured. On the basis of this temperature, the evaluation unit 26 or another control system regulate a heat output of the furnace 20 to the predetermined temperature T.

The infrared sensor 24 has a field of view that is defined by an aperture 35, particularly an iris, and extends about an optical axis $A_{24}$. The sample 14.1 is located completely in the field of view $S_{24}$ of the infrared sensor 24, so that the infrared sensor 24 only detects infrared radiation 22 that originates from the sample 14.1.

It is practical if the thermal diffusivity measuring device 10 comprises an adjustment unit 37, by means of which the furnace 10 can be adjusted relative to the light path 20.

The optical system 18 has a beam expander 36, for example a lens. In the present case, the optical system 18 also has a deflection mirror 38. The beam expander 36 is designed in such a way that the beam expanding effect is greater for the light of the pulse light source 27 than for the light of the continuous wave laser 46. In the present case, the lens only has an influence on the light of the pulse light source 27.

It is possible and provided for in the present embodiment, but not essential, that the deflection mirror is mounted by means of a guide 40 such that it can be displaced. It is therefore possible to displace the light path 20 transverse to the optical axis $A_{24}$ of the infrared sensor 24 by a lateral offset s. After displacement, the optical axis $A_{20}$ of the light path 20 extends parallel to the optical axis $A_{24}$, but at a lateral offset.

The sample holder 12 constitutes part of a sample changer 41 on which the sample holders 12.*i* for the samples 14.*i* are configured. The sample holders 12.*i* can be rotated collectively by means of a rotary drive 42 about a sample holder rotational axis $A_{12}$ and a predetermined angular position β of the sample changer 41 can be set. Furthermore, a schematically depicted positioning drive 44 can be used to set a distance $r_{14.i}$ of the samples 14.*i* from the sample holder rotational axis $A_{12}$. As a result, each sample 14.*i* can be positioned in the two degrees of freedom β and r transverse to the optical axis $A_{20}$.

Figures 2A, 2B:
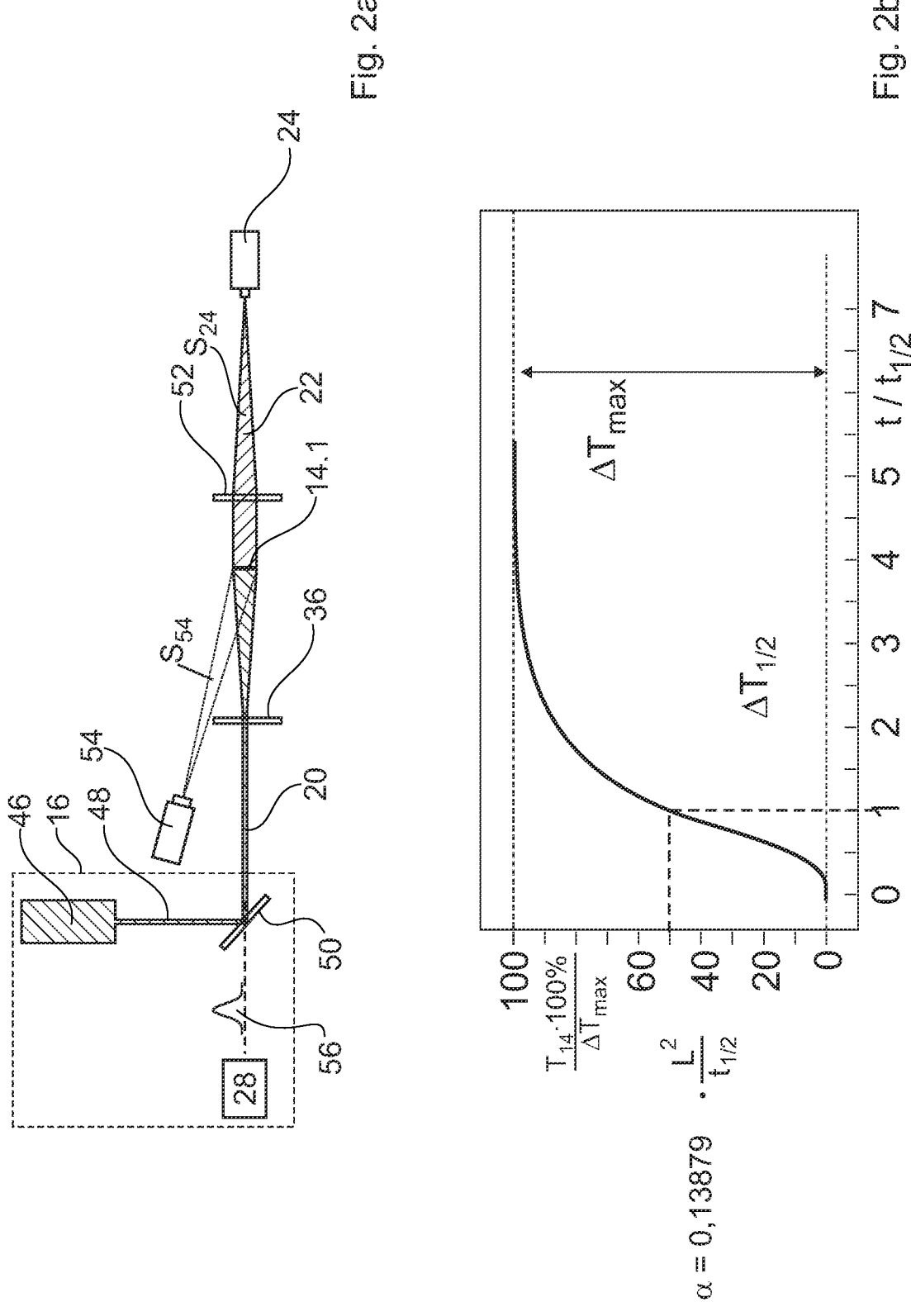

FIG. 2*a* depicts a schematic view of the thermal diffusivity measuring device 10 according to FIG. 1. It shows that the light source 16 also comprises a continuous wave laser 46, by means of which an intensity-modulated laser beam 48 can be emitted. An intensity $I_{48}$ of the laser beam can then be described using the formula $$I_{48} = I_0 I \sin 2\pi f_I \tag{1}$$

The laser beam 48 is injected into the light path 20 using a light injector 50. In the present case, the light injector 50 is formed by a dichroic mirror. If a dichroic mirror is used as a light injector, it is necessary for the two light sources to have two different wavelengths. Alternatively, the light injector 50 can be a beam splitter, for example. Instead of the dichroic mirror, the light injector may also be designed, for example, as a movable, for example folding, mirror that can be moved by a drive.

FIG. 2*a* also shows that a collection lens 52 is arranged behind the sample 14.1 that focuses the infrared radiation 22 emitted by the sample 14.1 onto the infrared sensor 24.

FIG. 2*a* also shows that the thermal diffusivity measuring device 10 can feature a camera 54 in whose field of view $S_{54}$ the sample 14.1 is situated. In other words, the camera 54 can be used to record an image of the surface of the sample 14.1 onto which the pulse of light and the laser beam 48 fall.

FIG. 2*b* schematically depicts the dependency of a temperature $T_{14}$ of the sample 14.1 measured by the infrared sensor 24 when a pulse of light 56 strikes the sample 14.1, which has a thickness L. At the time t=0, the pulse of light is emitted onto the sample 14.1. After the half rise time $t_{1/2}$ the temperature $T_{24}$ has risen to half the maximum value $\Delta T_{max}$ that the temperature reaches at its maximum. On the basis of the formula $$\alpha = 0.13879 \frac{L^2}{t_{1/2}} \tag{2}$$

the thermal diffusivity α is calculated by the evaluation unit 26 from the half rise time $t_{1/2}$.

The thermal diffusivity measuring device performs a method according to the invention in that the evaluation unit 26 first controls the light source 16 so that the pulse laser 28 emits a pulse of light. This strikes the sample 14.1 and illuminates a point S0, as is schematically illustrated in FIG. 3.

The infrared sensor 24 records the intensity of the infrared radiation 22 in a continuous and time-dependent manner, as shown in FIG. 2*b*. From this, the thermal diffusivity au is calculated from the thickness L of the sample 14.1 stored in the evaluation unit 26 and the half rise time $t_{1/2}$ using the indicated drawing.

If there are at least two samples 14.*i*, the sample changer 41, in particular its rotary drive 42, is then controlled by the evaluation unit 26 in such a way that the second sample 14.2 is moved into the light path 20. Its thermal diffusivity $\alpha_{14.2}$ is then determined on the second sample using the pulse of light. The thermal diffusivities $\alpha_{14.i}$ of the remaining samples are subsequently measured in the same way.

The evaluation unit 26 then controls the continuous wave laser 46 in such a way that it generates an intensity-modulated laser beam 48 that strikes the sample 14.1 at a first strike point, which can also be referred to as a first point S1. On the basis of the formula $$\theta = L \sqrt{\frac{\pi}{\alpha}} \sqrt{f_I} \tag{3}$$

the evaluation unit 26 determines the thermal diffusivity α from a phase shift θ between the intensity modulation of the laser beam 48 on the one hand and the infrared radiation intensity $I_{22}$ on the other, the intensity modulation frequency $f_I$ and the infrared radiation intensity $I_{22}$ as well as the thickness L and π (Pi). If the course of the measurement data deviates from the linear dependence of the phase shift θ on the root of the intensity modulation frequency $f_I$, only measurement data $\theta(\sqrt{f_I})$ in the interval in which the linear dependence exists are used.

The positioning drive 44 and/or the rotary drive 42 are subsequently controlled by the evaluation unit 26 in such a way that the laser beam 48 strikes at a second point S2. It can be seen that the diameters of the surfaces at the points S1, S2, which are illuminated by the intensity-modulated laser beam 48, are considerably smaller than the diameter of the surface of the point S0 illuminated by the pulse of light. In particular, the diameters of the surfaces at the points S1, S2 are at most half or at most a third, especially preferably at most a quarter, of the diameter of the surface illuminated by the pulse of light.

If the thermal diffusivity α is to be measured as a function of the temperature T, the evaluation unit 26 controls the furnace 30 in such a way that it approaches different temperatures $T_j$ one after the other. Of course, it is also possible that another control or regulation system carries out the control of the furnace 30. If the evaluation unit 26 detects that the respective temperature T is reached, it conducts the method described above.

To detect the position of the laser beam 48 on the sample 14.1, an image is recorded using the camera 54. It is possible, but not essential, for the laser beam 48 to fall on the sample in the process. If the camera 54 is sensitive in the infrared range, as provided for by a preferred embodiment, the position of the laser beam 48 on the sample 14.1 can be directly recorded. The at least one image can be stored in a digital memory of the evaluation unit 26. It is then possible to directly assign the location where the thermal diffusivity was measured to a location on the surface of the sample.

To measure the thermal diffusivity transverse to the optical axis $A_{24}$ of the infrared sensor 24, the deflection mirror 38 is moved by means of a displacement drive 39 in such a way that it has a lateral offset s to the optical axis $A_{24}$ of the infrared sensor 24.

The thermal diffusivity $\alpha_q$ transverse to the optical axis $A_{24}$ of the infrared sensor 24 is calculated by the evaluation unit 26 on the basis of the formula $$\theta = L\sqrt{\frac{\pi}{\alpha_q}}\sqrt{f_I}\,s \tag{4}$$

If the course of the measured data $\theta(s)$ deviates from the linear dependence of the phase shift $\theta$ on the lateral offset s, only measured data $\theta(s)$ in the interval in which the linear dependence exists are used.

A measurement uncertainty $u_{ist}$ is also calculated for each measurement of the thermal diffusivity. To this end, the mean squared error between the curves are calculated according to the formulas (3) or (4) or sections of the curves on the one hand and the measured values on the other.

Assuming an adiabatic heating, the curve according to FIG. 2b can be described as $$T(x = L, t) = \frac{q_0}{\rho c_p V}\left[1 + 2\sum_{n=1}^{\infty}(-1)^n\exp\left(-\frac{n^2\pi^2\alpha t}{L^2}\right)\right] \tag{5}$$

In this case, $q_0$ is the laser energy density, $c_p$ the specific thermal capacity, p the density of the sample and V the volume of the sample.

Figures 3A, 3B:
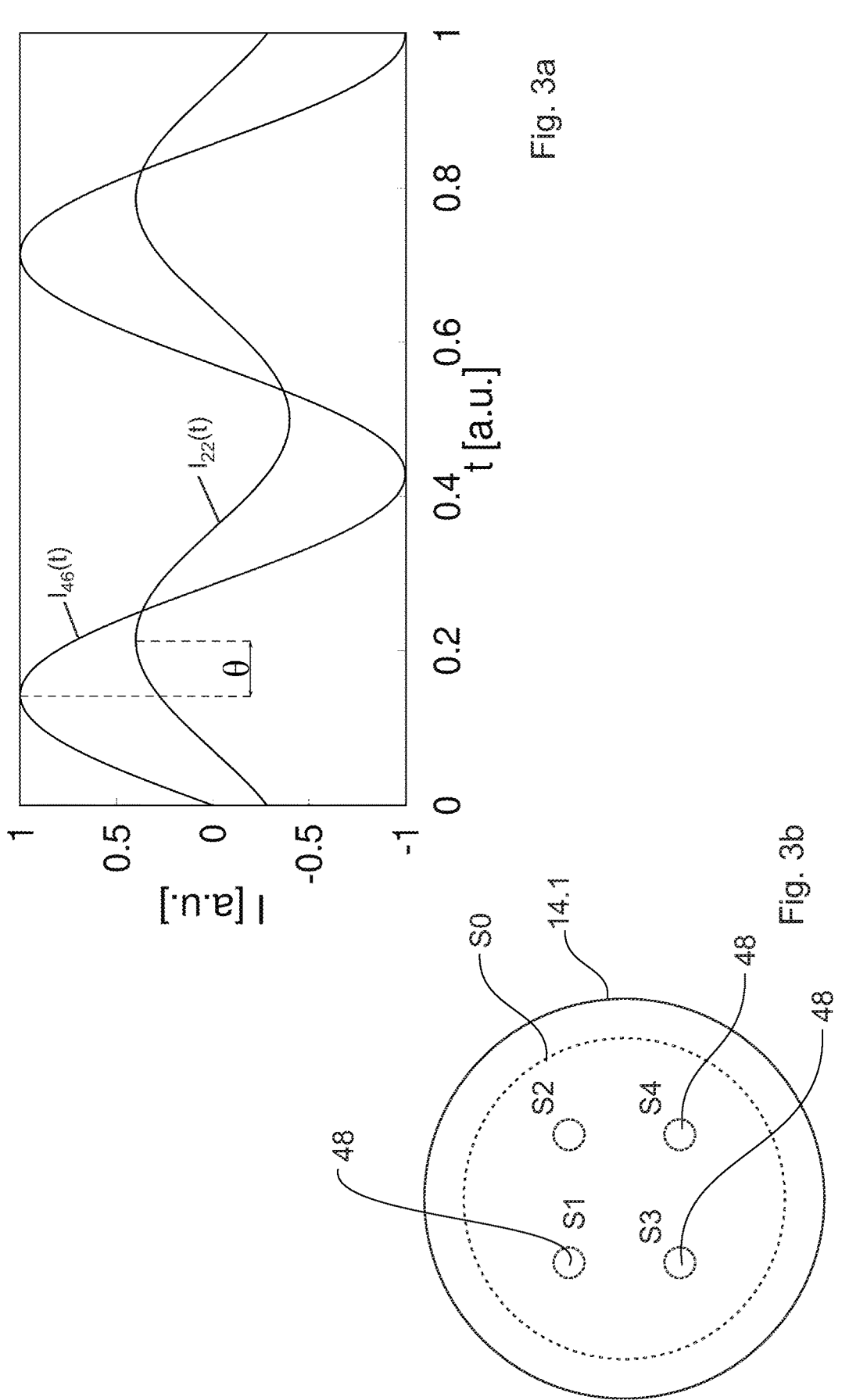

FIG. 3a depicts the dependence of the temporal course of the infrared radiation intensity $I_{22}(t)$ on the time tin arbitrary units on the one hand and the dependence of the temporal course of the laser radiation intensity $I_{46}(t)$ of the continuous wave laser 46 on the time t on the other. As illustrated, the phase shift $\theta$ an be determined, for example, from the temporal position of the respective maximum.

If the measurement uncertainty $u_{ist}$ exceeds a predetermined measurement uncertainty thresh-old value $u_{max}$, a warning signal can be emitted. This warning signal can be emitted acoustically, optically or electrically.

It is possible that the number of points Si at which the thermal diffusivity is measured is reduced, in particular to zero, if the measurement uncertainty threshold value $u_{max}$ is exceeded.

FIG. 3b shows a schematic view of a sample surface of the sample 14.1 with the points S1, S2, S3, S4 at which is the laser beam 48 strikes for the spatially resolved measurement of thermal diffusivity. The point S0 denotes the area that is illuminated by the pulse of light 56. It can be seen that an averaging effect occurs due to the size of the point S0.

FIG. 4a shows a second embodiment of a thermal diffusivity measuring device 10 according to the invention in which the pulse light source 27 of the light source 16 is formed by a flash lamp 57. In the present case, the flash lamp 56 is a xenon flash lamp. The flash lamp 57 features a flash tube 58 that receives a current pulse from a charging circuit 60 and then emits a flash of light.

The light of the flash of light is reflected by a reflector 62 onto collection optics 64. The collection optics 64 form a pulse of light that expands along the light path 20. An opening 66 is designed in the reflector 62 through which the laser beam 48 passes. As a result, the laser beam 48 passes through the flash lamp 57.

FIG. 4b depicts a second preferred embodiment of the flash tube 58 which is curved and, in the present case, has a circular curvature. The laser beam 48 passes through the space surrounded by the curved flash tube 58. The reflector 62 is schematically illustrated.

FIG. 4c shows a third preferred embodiment of the flash tube 58, which has a U-shaped curvature. The laser beam 48 also passes through the space surrounded by the curved flash tube 58.

Figure 5:
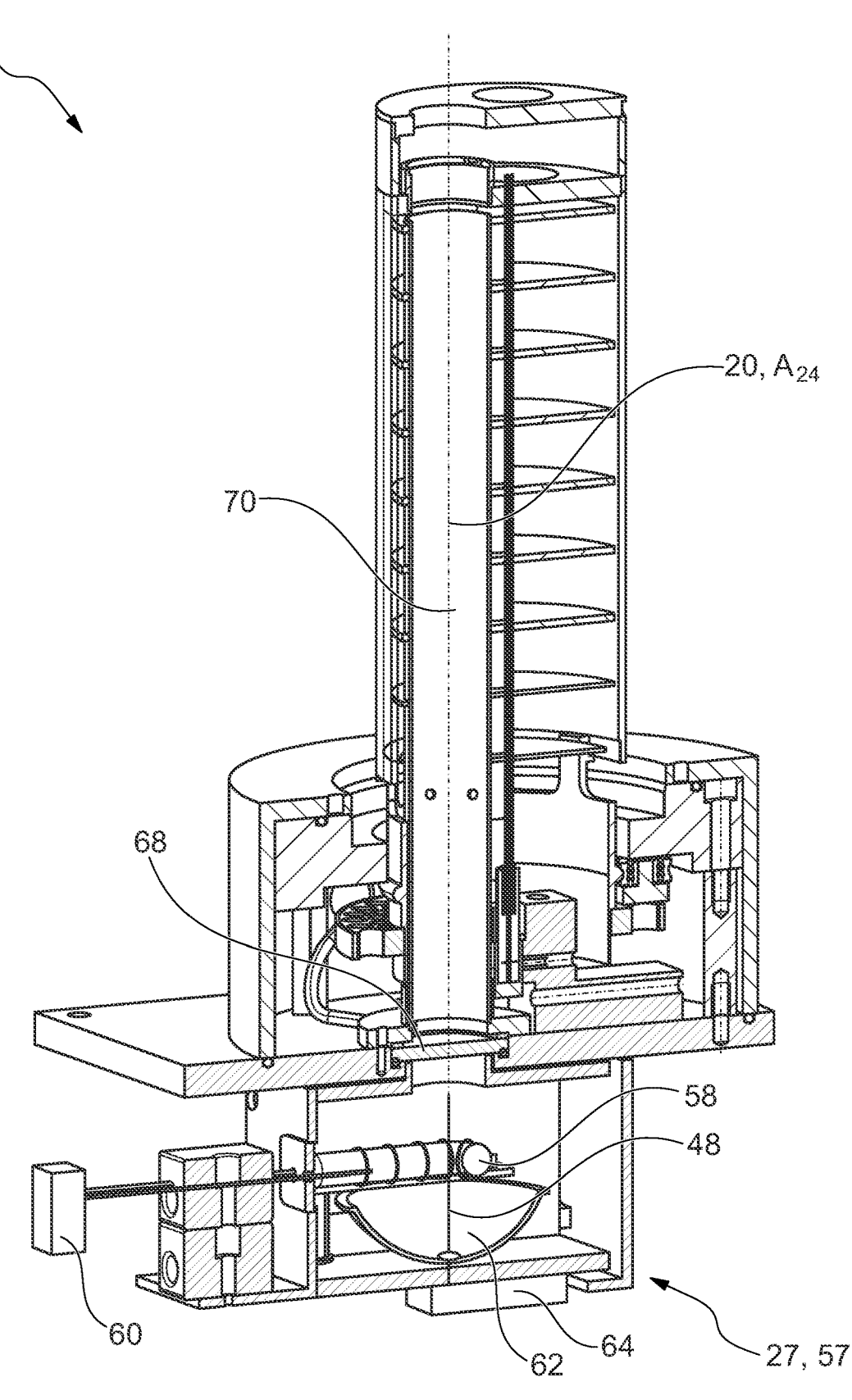

FIG. 5 depicts a sectioned perspective view of a light source 16 of a thermal diffusivity measuring device according to the invention. The light of the flash lamp 57 passes through a window 68 into a light guide tube 70. The light guide tube 70 may comprise a reflective coating on its inner side, for example made of gold or nickel.

For example, the light guide tube 70 is made of stainless steel, particularly Inconel.

REFERENCE LIST

10 thermal diffusivity measuring device
12 sample holder
14 sample
16 light source
18 optical system
20 light path
22 infrared radiation
24 infrared sensor
26 evaluation unit
27 pulse light source
28 pulse laser
30 furnace
32 heating element
34 adjustment unit
36 beam expander
38 deflection mirror
39 displacement drive
40 guide
41 sample changer
42 rotary drive
44 positioning drive
46 continuous wave laser
48 laser beam
50 light injector
52 collection lens
54 camera
56 pulse of light
57 flash lamp
58 flash tube
60 charging circuit
62 reflector
64 collection optics
66 opening
68 window
70 light guide tube
$\alpha$ Thermal diffusivity
$\alpha_q$ thermal diffusivity transverse to $A_{24}$
$\beta$ Angular position
$\theta$ Phase shift between the intensity modulation and infrared radiation intensity
$A_{24}$ optical axis of the infrared sensor
$A_{20}$ optical axis of the light path
$A_{24}$ optical axis of the infrared sensor
$A_{12}$ rotary drive rotational axis $f_I$ intensity modulation frequency running index of samples $I_{22}$ infrared radiation intensity $I_{46}$ laser radiation intensity L thickness $r_{14.i}$ distance of sample 14.*i* from the rotary drive rotational axis s lateral offset S field of view t time T temperature $t_{1/2}$ half rise time u measurement uncertainty $u_{max}$ measurement uncertainty threshold value W impulse energy

The invention claimed is:

1. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, and a camera arranged to record an image of the sample, wherein the calculator-controller is designed to automatically calculate the thermal diffusivity of the sample on the basis of the time-dependent detection of the infrared radiation intensity and the intensity modulation frequency.

2. The thermal diffusivity measuring device according to claim 1, wherein the calculator-controller automatically calculates the thermal diffusivity of the sample using the time-dependent infrared radiation intensity caused by one pulse of light and/or according to a light pulse method.

3. The thermal diffusivity measuring device according to claim 1 further comprising a sample changer, wherein the sample holder comprises a first sample holder for holding a first sample and at least one second sample holder for holding at least one second sample, and wherein the sample changer permits changing between the first sample holder and the at least one second sample holder, and wherein the calculator-controller is configured to automatically carry out a method comprising:

(i) measuring the thermal diffusivity of the first sample using the intensity-modulated laser beam, (ii) controlling the sample changer such that at least one second sample held by at least one second sample holder is brought into the light path, (iii) measuring the thermal diffusivity of the at least one second sample using the intensity-modulated laser beam, and (iv) subsequently measuring the thermal diffusivity of the at least one second sample using a pulse of light.

4. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, wherein the calculator-controller is designed to automatically calculate the thermal diffusivity of the sample on the basis of the time-dependent detection of the infrared radiation intensity and the intensity modulation frequency, and a sample changer, wherein the sample holder comprises a first sample holder and at least one second sample holder, and where in the sample changer comprises both the first sample holder and the at least one second sample holder, and wherein the calculator-controller is configured to automatically carry out a method comprising:

(i) measuring a thermal diffusivity of a first sample held by the first sample holder using the intensity-modulated laser beam or the pulse of light, (ii) controlling the sample changer so that at least one second sample held by the least one second sample holder is brought into the light path, (iii) measuring the thermal diffusivity of the at least one second sample using the intensity-modulated laser beam or the pulse of light used in step (i), and (iv) subsequently measuring the thermal diffusivity of the first sample and the at least one second sample using the intensity-modulated laser beam or the pulse of light, whichever was not used in step (i).

5. The thermal diffusivity measuring device according to claim 4 wherein the light source comprises a flash lamp, and wherein the intensity-modulated laser beam passes through the flash lamp.

6. The thermal diffusivity measuring device according to claim 4 further comprising a furnace designed to set at least a first predetermined temperature and a second predetermined temperature different from the first predetermined temperature, and a sample changer, wherein the sample holder comprises a first sample holder for holding a first sample and at least one second sample holder for holding at least one second sample, and wherein the sample changer permits changing between the first sample holder and the at least one second sample holder, and wherein the calculator-controller is configured to automatically carry out a method comprising:

(i) detecting that the furnace is at the first predetermined temperature, (ii) measuring the thermal diffusivity of the first sample using either the intensity-modulated laser beam or the pulse of light, (iii) controlling the sample changer such that the at least one second sample is brought into the light path, (iv) measuring the thermal diffusivity of the at least one second sample using the intensity-modulated laser beam or the pulse of light used in step (ii), (v) subsequently measuring the thermal diffusivity of the first sample and the at least one second sample using the intensity-modulated laser beam or the pulse of light, whichever was not used in step (ii), and (vi) repeating the steps (i) to (v), except performing them at the second predetermined temperature.

7. The thermal diffusivity measuring device according to claim 4 wherein the calculator-controller is configured to automatically carry out a method comprising:

(i) measuring thermal diffusivity by means of an intensity-modulated laser beam at at least two points on the sample, and (ii) determining a measurement uncertainty for the measurement of the thermal diffusivity measured in step (i) using a pulse of light, and if the measurement uncertainty exceeds a predetermined measurement uncertainty threshold value, then reducing the number of points measured in step (i).

8. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, wherein the calculator-controller is designed to automatically calculate the thermal diffusivity of the sample on the basis of the time-dependent detection of the infrared radiation intensity and the intensity modulation frequency, and a furnace designed to set at least a first predetermined temperature and a second predetermined temperature different from the first predetermined temperature, wherein the sample holder is arranged in the furnace, wherein the calculator-controller is configured to automatically carry out a method comprising:

(i) controlling the furnace so that the furnace is brought up to the first predetermined temperature, (ii) detecting that the furnace is at the first predetermined temperature, (iii) at the first predetermined temperature, measuring a first thermal diffusivity and a second thermal diffusivity of the sample in the sample holder respectively using (a) the intensity-modulated laser beam, and (b) the pulse of light, (iv) controlling the furnace so that the furnace is brought up to the second predetermined temperature, (v) detecting that the furnace is at the second predetermined temperature, and (vi) at the second predetermined temperature, measuring a first thermal diffusivity and a second thermal diffusivity of the sample in the sample holder respectively using (a) the intensity-modulated laser beam, and (b) the pulse of light.

9. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, and wherein the calculator-controller is designed to automatically calculate the thermal diffusivity of the sample on the basis of the time-dependent detection of the infrared radiation intensity and the intensity modulation frequency, wherein the calculator-controller is configured to automatically carry out a method comprising:

(a) measuring the thermal diffusivity using a pulse of light to obtain a light pulse thermal diffusivity measured value, (b) performing time-resolved measurement of thermal diffusivity using an intensity-modulated laser beam at at least two points to obtain an Angstrom thermal diffusivity measured value, and (c) calculating an inhomogeneity parameter that describes an inhomogeneity of the thermal diffusivity of the sample from the light pulse thermal diffusivity measured value and the Angstrom thermal diffusivity measured values.

10. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, and wherein the calculator-controller is designed to automatically calculate the thermal diffusivity of the sample on the basis of the time-dependent detection of the infrared radiation intensity and the intensity modulation frequency, wherein the sample comprises two or more samples, and wherein the sample holder is designed to position the two or more samples in two positional degrees of freedom transverse to an optical axis of the infrared sensor.

11. A thermal diffusivity measuring device, comprising:

a sample holder for accommodating a sample to be measured, a light source designed to emit a pulse of light of a predetermined impulse energy, an optical system for directing the pulse of light in a light path onto the sample, an infrared sensor configured for a time-dependent detection of an infrared radiation intensity emitted by the sample, a calculator-controller for calculating a thermal diffusivity of the sample, a continuous wave laser designed to emit an intensity-modulated laser beam, wherein the intensity-modulated laser beam has an intensity that is modulated with an intensity modulation frequency, and wherein the intensity modulated laser beam is emitted along the light path onto the sample, and wherein the calculator-controller is designed to automatically calculate the thermal diffusivity of the sample on the basis of the time-dependent detection of the infrared radiation intensity and the intensity modulation frequency, wherein the optical system is designed to displace the light path transverse to an optical axis of the infrared sensor so that one or more lateral offsets between the optical axis of the infrared sensor and a strike point of the laser beam are adjustable.

\* \* \* \* \*